(12) United States Patent
Arssov

(10) Patent No.: US 7,721,082 B2
(45) Date of Patent: May 18, 2010

(54) METHOD FOR ADVERTISING USING THE BIOS OF A PERIPHERAL CARD, A SOFTWARE PROGRAM BASED ON THE SAID METHOD, AND A HARDWARE PERIPHERAL CARD USING THE SAID METHOD AND PROGRAM

(76) Inventor: Paul (Plamen) Arssov, 7930 Avenida Navidad #116, San Diego, CA (US) 92122

( * ) Notice: Subject to any disclaimer, the term of this patent is extended or adjusted under 35 U.S.C. 154(b) by 700 days.

(21) Appl. No.: 11/620,924

(22) Filed: Jan. 8, 2007

(65) Prior Publication Data
US 2008/0168265 A1    Jul. 10, 2008

(51) Int. Cl.
*G06F 15/177*    (2006.01)
(52) U.S. Cl. .................... 713/2; 713/1; 713/100
(58) Field of Classification Search .......... 713/1, 713/2, 100
See application file for complete search history.

(56) References Cited

U.S. PATENT DOCUMENTS

| | | | |
|---|---|---|---|
| 2002/0073305 A1* | 6/2002 | Joseph et al. | 713/1 |
| 2003/0013483 A1* | 1/2003 | Ausems et al. | 455/556 |
| 2003/0122864 A1* | 7/2003 | Jenne et al. | 345/738 |
| 2007/0118728 A1* | 5/2007 | Zhao et al. | 713/1 |
| 2008/0077784 A1* | 3/2008 | Robinson et al. | 713/1 |

* cited by examiner

*Primary Examiner*—Dennis M Butler

(57) ABSTRACT

A new method of advertising where the advertising information is presented visually (displayed) on the screen of the computer system, and/or in auditory way (as a sound) on the sound system of a computer system, a software program based on the said method, and a hardware peripheral card using the said method and program.

The information is presented after powering on of the computer and before booting an operating system, or after rebooting the operating system and before the next boot. The computer system contains a motherboard, to which is attached a peripheral card, which includes a memory chip, which includes peripheral BIOS. The said peripheral BIOS includes advertising information and advertising related program. The peripheral BIOS program executes the advertising related program, which then presents the stored advertising information visually and/or in auditory way.

13 Claims, 3 Drawing Sheets

METHOD FOR ADVERTISING USING THE BIOS OF A PERIPHERAL CARD, A SOFTWARE PROGRAM BASED ON THE SAID METHOD, AND A HARDWARE PERIPHERAL CARD USING THE SAID METHOD AND PROGRAM

BACKGROUND OF THE INVENTION

1. Field of the Invention

The invention herein relates to advertising in computer systems, and to Basic Input/Output System (BIOS).

2. Description of Related Art

Currently the mass market computers have a motherboard which contains a memory chip which stores a small program which initializes the computer after turning the power on. The program is called BIOS, and the memory chip storing permanently this program—BIOS chip.

After powering on the system the BIOS program displays a text or an image on the screen of a computer, and the user can enter a menu and by using the keyboard, change some parameters. Then an operating system is loaded and executed—in a process called booting.

There are a number of companies makers of the BIOS program, providing the BIOS program to a large number of motherboard manufacturers. These manufacturers often want to distinguish themselves from one another and often display a text or a graphics screen with information on themselves with some of the—company logo, web site, product name, model number . . . etc.

In this way the manufacturer of the motherboard is distinguishing and advertising its own products.

The motherboards of computer system have the way of attaching additional hardware—peripheral cards which increase the capabilities of the computer system. Some of these peripheral cards can have its own memory chip where a program—peripheral BIOS can be permanently stored.

The motherboard BIOS through the process of executing, does a search for, and if it finds—calls the peripheral BIOS and executes the stored program.

The peripheral BIOS, when executing, normally displays only the name of the company manufacturer, and model number, in addition to some technical parameters of the peripheral card which can be adjusted through user interaction.

The motherboard BIOS program together with the peripheral BIOS program is running/executing on the computer system normally for a period of as little as 1 s and as much as 30 s or more, before loading and executing an operating system stored on the computer system.

The execution can be stopped, and then allowed to continue, by pushing a particular key on a keyboard or a combination of keys.

The time between:
from power on to booting an operating system,
or from shut down and reboot of already loaded operating system, to booting again of an operating system, is currently not utilized for providing information other than the manufacturer's or for adjusting technical parameters on the motherboard or the peripheral.

This time can be used to display simple advertising messages in text or graphics on the computer screen, or in sound on the sound system of the computer equipped with it.

SUMMARY OF THE INVENTION

The object of the present invention is to provide a new method for advertising using the BIOS of a peripheral card, a software program based on the said method, and a hardware peripheral card using the said method and program.

In addition to initializing the peripheral card, the new method utilizes the peripheral BIOS chip to store advertising information, and the BIOS program can display in text or graphics, or in sound a variety of advertising information from third party companies.

The new method utilizes the time between:
powering on of a computer system and booting the operating system,
or after shutdown with a restart, and booting of the operating system.

This time varies and can be between as little as 1 s and up to 30 s or more. The user can hold the displaying of the advertising messages in order to have more time to read and/or hear the said messages, and then release the hold and allow the system to continue.

The new method brings the advertising information:
visually on the computer screen—in text, or in graphics,
or in auditory way through the sound system of the computer system
in human speech or in melody,
or in combination of visual and auditory information.

The advertising information stored in the BIOS chip of the peripheral, can contain a single advertising or multiple advertising messages. The advertising information can be customized based on the day of the week, and the time of the day. The advertising information can be updated with different advertising messages by re-programming the BIOS chip.

DETAILED DESCRIPTION OF THE INVENTION

The object of the present invention—the new method for advertising using the BIOS of a peripheral card, a software program based on the said method, and a hardware peripheral card using the said method and program, is described in details on the drawings.

Figure 1:
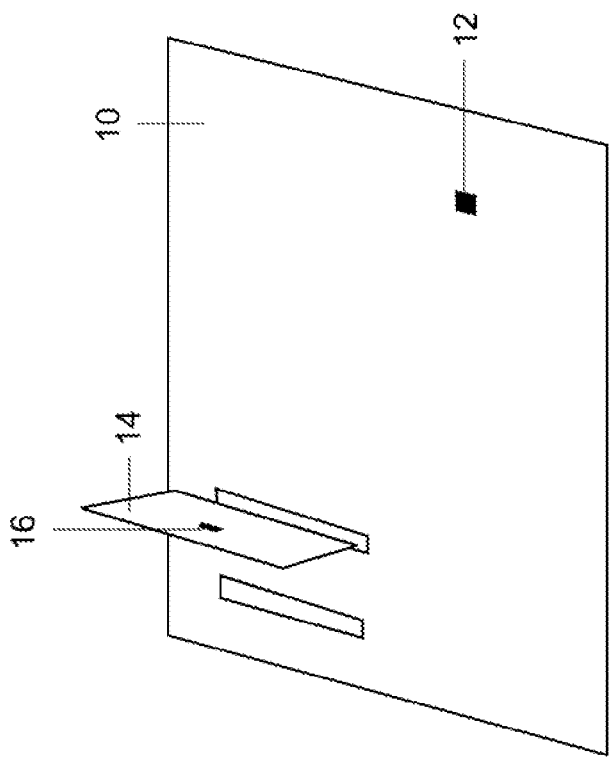
FIG. 1 is a diagram showing a motherboard with a peripheral card attached

FIG. 1 shows a motherboard 10, containing motherboard BIOS 12, and a peripheral card 14, attached to the motherboard. The peripheral card 14 contains a peripheral BIOS 16.

After power on, or after restart of the already loaded operating system the program stored in the motherboard BIOS 12 is executed, and it then executes the program stored in the peripheral BIOS 16. The various components and buses of the computer motherboard are well known and thus not shown.

Figure 2:
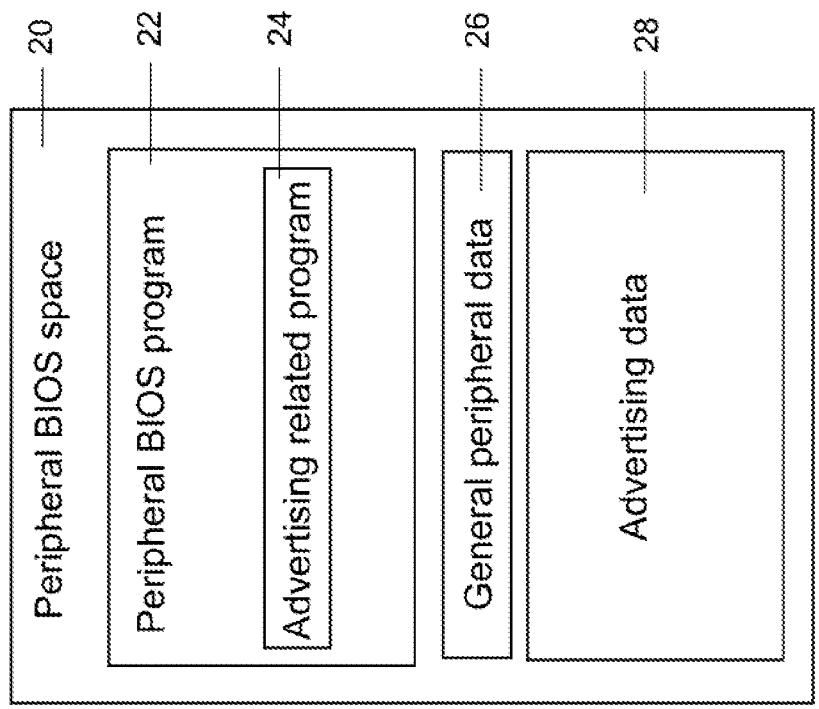
FIG. 2 is a diagram showing a peripheral BIOS content

FIG. 2 shows the peripheral BIOS content where the total peripheral BIOS space 20 is divided between peripheral BIOS program 22, the general peripheral data 26, and the advertising data 28. Within of the peripheral BIOS program 22, there is the advertising related program 24.

When the peripheral BIOS program 22 is executing, it executes the advertising related program 24, which presents the advertising data 28 in visual or a sound form.

Figure 3:
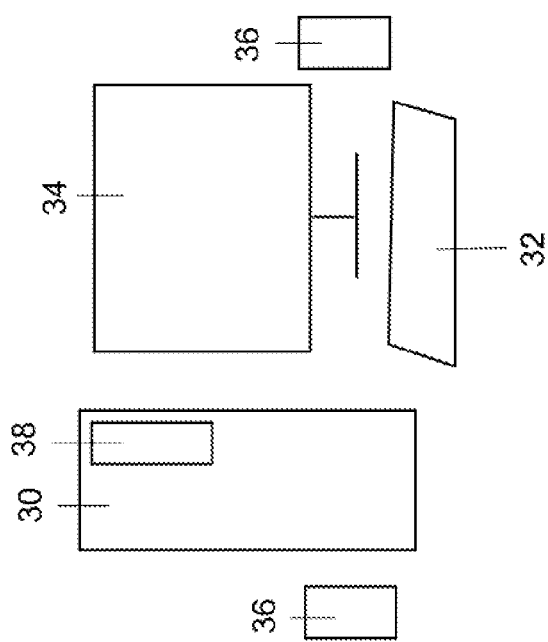
FIG. 3 is a diagram showing a desktop computer system equipped with a motherboard with an attached peripheral card

FIG. 3 shows a desktop computer system 30 having—a keyboard 32, display 34, and a sound system 36. The desktop computer system 30 is equipped with a motherboard with an attached peripheral card with BIOS, including advertising program and advertising information 38, as the peripheral card 14 on FIG. 1. The attached peripheral card has a peripheral BIOS as realized on FIG. 2.

After turning the power on, or after reboot of the previously loaded operating system the computer system 30 puts a text and/or graphics messages on the display 34, and/or plays sound messages on the sound system 36.

The various components and buses of the desktop computer system are typically well known and thus not shown.

Figure 4:
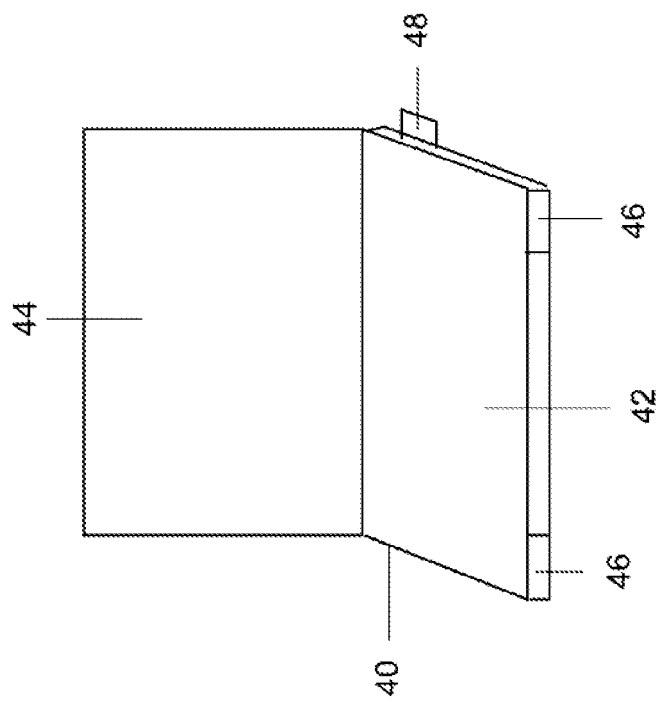
FIG. 4 is a diagram showing a notebook computer system equipped with an attached peripheral card

FIG. 4 shows a notebook computer system 40 having—a keyboard 42, display 44, and a sound system 46. The desktop computer system 40 is equipped with a motherboard with an attached peripheral card with BIOS, including advertising program and advertising information 48, as on the peripheral card 14 on FIG. 1. The attached peripheral card has a peripheral BIOS as realized on FIG. 2.

After turning the power on, or after reboot of the previously loaded operating system the computer system 40 puts a text and/or graphics messages on the display 44, and/or plays sound messages on the sound system 46.

The various components and buses of the notebook computer system are typically well known and thus not shown.

While FIG. 3 and FIG. 4 show embodiments for a desktop and for a notebook computer system, the embodiment of the method in the invention can be used in many other computer systems including workstation computers, server computers, handheld computers, palmtop computers, personal digital assistants (PDA), etc.

Figure 5:
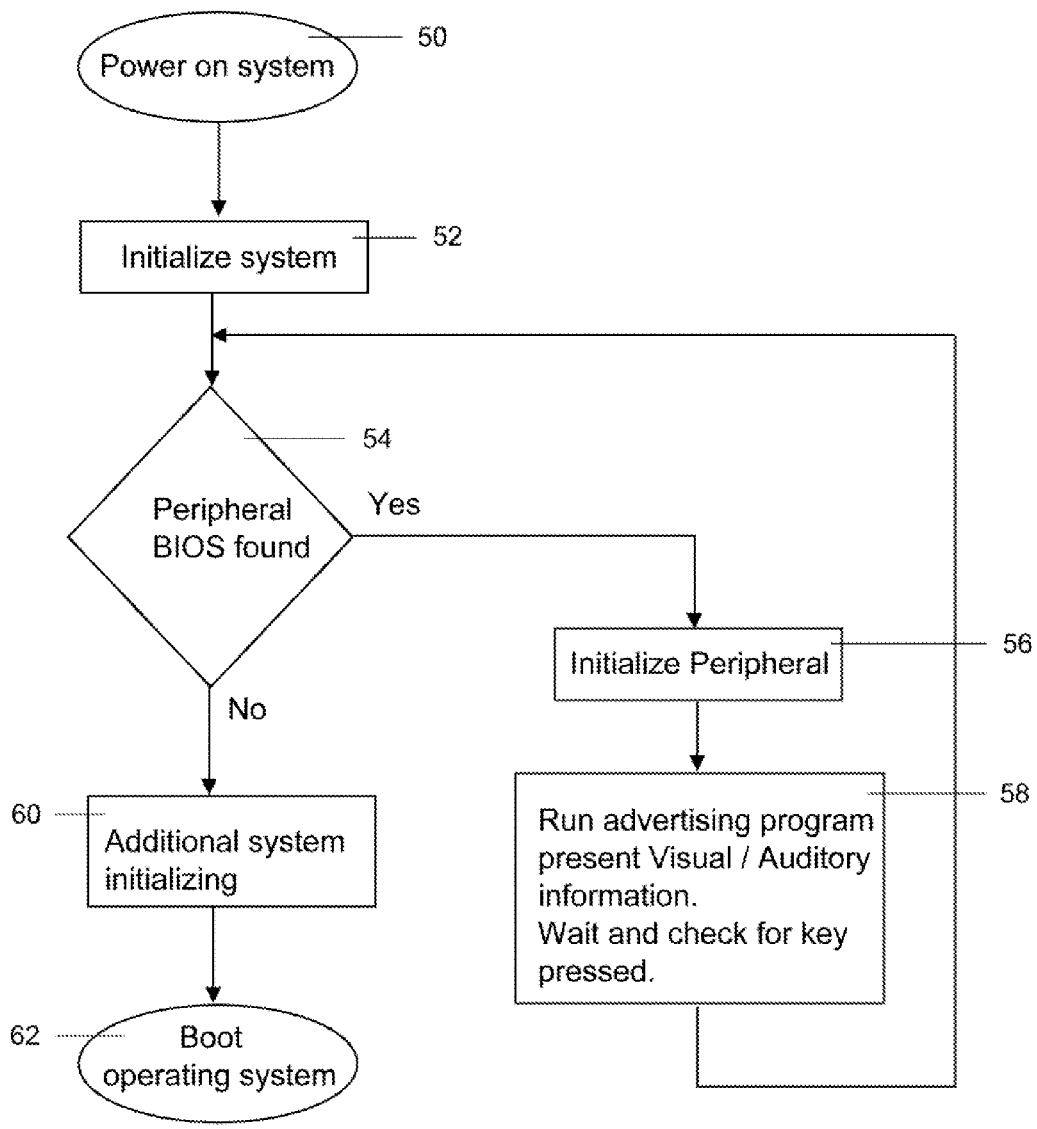
FIG. 5 is a flowchart showing a sequence of events

FIG. 5 shows the sequence of execution in a computer system. From the moment of Power on the system 50, the central processing unit (CPU) of the system does initializing of the system 52, and then performs a search to find if peripheral BIOS is found 54.

In the event of 'Yes', the execution of the system is transferred from the BIOS on the motherboard to the peripheral BIOS, and initializing of the peripheral 56 is performed. When the peripheral BIOS is embodied in the way as on FIG. 2, the CPU does run the advertising program and presents Visual/Auditory information.

The information is presented for a time period, and the CPU waits and checks for a key or a combination of keys pressed. If such event is detected the user of the computer system can exercise control over the way of presenting of Visual/Auditory information.

After the end of a time period, the peripheral BIOS transfers the control back to the motherboard BIOS, where the system performs again a search to find if another peripheral BIOS is found 54.

In the event of 'No', after no other peripheral BIOS is found the system performs additional system initializing 60, and then does boot of the operating system 62.

The best implementation is to use the peripheral BIOS chip for storing a program and advertising info for displaying text based advertising messages stored in the peripheral BIOS chip. Additionally the said program can display graphics, or play sound based message.

One alternative embodiment is to use the motherboard BIOS to store an advertising program and advertising info for displaying on screen or playing on a sound system of advertising information.

Another embodiment is to use the motherboard BIOS or peripheral BIOS to store only the program related to advertising, and use the magnetic media, and/or optical storage media, and/or solid state media on the computer system—hard disk, CD/DVD, flash memory, for ex., to store the advertising messages, and display them on screen or play them on the sound system.

The invention can be reduced into practice in many different ways, including the following embodiments:

as a peripheral card based on the PCI bus, which can be mounted on a desktop computer, as a peripheral card based on the PCMCIA bus, which can be mounted on a notebook computer system capable of accepting PCMCIA cards, as a peripheral card based on the ExpressCard bus, which can be mounted on a notebook computer system capable of accepting ExpressCard cards.

All of the above embodiments may include non-volatile memory chip, containing peripheral BIOS program and advertising information. The peripheral BIOS program includes advertising related program.

The description of the embodiments of this invention has been presented for purposes of illustration. The embodiments were chosen and described to provide the best illustration of the principles of this invention and its practical application.

Those skilled in the art are enabled by the said illustration to utilize the invention in various embodiments and with various modifications as are suited to the particular use contemplated.

All such modifications and variations are within the scope of the present invention as determined by the appended claims.

The invention claimed is:

1. A method of advertising in a computer system including an attached peripheral card having a memory chip storing a peripheral BIOS program, the method comprising:

storing advertising information and an advertising related program in said peripheral BIOS;

powering on or rebooting the computer system;

executing, by the computer system, the peripheral BIOS program, wherein the peripheral BIOS program transfers control to the advertising related program;

presenting the stored advertising information visually on a display of the computer system;

ending the presentation of the advertising information;

transferring control from the advertising related program back to the peripheral BIOS program; and booting an operating system of the computer system.

2. A method of advertising in a computer system including an attached peripheral card having a memory chip storing a peripheral BIOS program, the method comprising:

storing advertising information and an advertising related program in said peripheral BIOS;

powering on or rebooting the computer system;

executing, by the computer system, the peripheral BIOS program, wherein the peripheral BIOS program transfers control to the advertising related program;

presenting the stored advertising information audibly on a sound system of the computer system;

ending the presentation of the advertising information;

transferring control from the advertising related program back to the peripheral BIOS program; and booting an operating system of the computer system.

3. The method according to claim 1 wherein the advertising information can be displayed in text or in graphics image, or both.

4. The method according to claim 2 where the advertising information can be played in human speech or as a melody.

5. The method according to claim 1, or claim 2 wherein the computer system can include a single visual or auditory advertising message, or multiple visual and/or auditory advertising messages.

6. The method according to claim 1, or claim 2 wherein the peripheral BIOS program obtains the day of the week and time of the day, selects a limited group of visual and/or sound advertising messages from all of the stored advertising information, and presents the selected group of advertising messages based on the obtained day and time.

7. The method according to claim 1, or claim 2 wherein user can press a key or a combination of keys on the keyboard of the computer system to control presenting of the visual or auditory advertising information including putting presenting on hold, changing the presented advertising information, and releasing the computer system to continue, in ways including going to a next visual page, or repeating a sound message.

8. The method according to claim 1, or claim 2 wherein the advertising information stored in the peripheral BIOS is updated periodically by re-programming the memory chip.

9. The method according to claim 1, or claim 2 wherein the advertising information is stored in compressed form that reduces its size, and the advertising program in the peripheral BIOS includes a function for decompressing that changes the information to a form appropriate for visual and/or auditory presentation.

10. The method according to claim 1, or claim 2 wherein statistics on the presentation of the advertising information are stored and returned when requested.

11. The method according to claim 1 wherein the advertising information can be presented visually for a predetermined fixed period of time, or for a variable period of time.

12. A software program stored on a computer readable medium that, when executed by a processor, performs the method steps according to any one of claims 3, 4, 11, 1 or 2 individual methods from claim 1 to claim 12, or a combination of the said methods.

13. A hardware peripheral card implemented using the software program as described in claim 12.

* * * * *